United States Patent
Kuba

Patent Number: 5,483,533
Date of Patent: Jan. 9, 1996

[54] TRAFFIC CONTROL SYSTEM OF LOCAL AREA NETWORK

[75] Inventor: Hiroaki Kuba, Tokyo, Japan

[73] Assignee: NEC Corporation, Tokyo, Japan

[21] Appl. No.: 279,799

[22] Filed: Jul. 25, 1994

[30] Foreign Application Priority Data

Jul. 23, 1993 [JP] Japan .................................... 5-183110
Jun. 21, 1994 [JP] Japan .................................... 6-138840

[51] Int. Cl.⁶ .......................... H04L 12/26; H04L 12/413
[52] U.S. Cl. .......................... 370/79; 370/85.3; 370/85.6; 370/85.7; 370/95.1; 340/825.06; 340/825.5
[58] Field of Search .............................. 370/79, 80, 85.3, 370/85.6, 94.3, 100.1, 85.7, 85.13, 95.1, 110.1, 103, 13, 17; 340/825.06, 825.16, 825.17, 825.5, 825.51

[56] References Cited

U.S. PATENT DOCUMENTS

| | | | |
|---|---|---|---|
| 5,029,164 | 7/1991 | Goldstein et al. | 370/79 |
| 5,127,002 | 6/1992 | Shaik et al. | 370/79 |
| 5,313,458 | 5/1994 | Suzuki | 370/80 |

*Primary Examiner*—Alpus Hsu
*Assistant Examiner*—Ricky Q. Ngo

*Attorney, Agent, or Firm*—Sughrue, Mion, Zinn, Macpeak & Seas

[57] ABSTRACT

A plurality of terminals are connected via LAN to a traffic control unit for allocating time slots in response to data transmission requests and for monitoring the LAN load. The traffic control unit includes a load monitoring section, a high traffic mode noticing section, a time slot noticing section and a high traffic mode releasing section and each of terminals includes a high traffic mode receiving section, a transmission control section, a time slot requesting section and an end noticing section. When the load monitoring section detects the high traffic state of the LAN, the high traffic mode noticing section notices to all the terminals that the system is set in a high traffic mode. When the high traffic mode receiving section of each terminal receives the notice, the high traffic mode is set. In the high traffic mode, the time slot requesting section in each terminal issues a time slot allocating request to the time slot noticing section only for the first data transmission after the high traffic mode has set, and the time slot noticing section allocates a time slot to the requesting terminal. When ending the data transmission the end noticing section the transmission end to the traffic control unit. When the load monitoring section detects the low traffic state, the high traffic mode releasing section notices to all the terminals that the system be set in a normal mode.

9 Claims, 6 Drawing Sheets

Δt : TRANSMISSION TIME A TIME SLOT te : TIME DIFFERENCE BETWEEN THE TRAFFIC CONTROL UNIT AND THE TERMINAL ts : HIGH TRAFFIC MODE START TIME tλ : TIME SLOT TIME PERIOD A CYCLE

FIG.6

TRAFFIC CONTROL SYSTEM OF LOCAL AREA NETWORK

BACKGROUND OF THE INVENTION

The present invention relates to a traffic control system of a local area network (to be referred to as a "LAN" hereinafter) of a Carrier Sense Multiple Access (CSMA) method or a Carrier Sense Multiple Access with Collision Detection (CSMA/CD) method.

Conventionally, there are generally used two types of traffic control system of the CSMA method or CSMA/CD method. In the first type of traffic control system, a carrier signal is monitored at data transmission starting so as to avoid the collision of transmission data. The detection of the carrier signal in a LAN, indicates that another terminal is on data transmission and the terminal delays the data transmission by a time period determined based on a random number generated by a random number generator, i.e., suspends the data transmission and monitors a carrier signal again. When any carrier signal is not detected, the data transmission is performed. If any carrier signal is detected after the delay of the data transmission, the delay is performed again and this operation is repeated until no carrier signal is detected.

In the second type of traffic control system, the number of terminals for data transmission which are connected to a LAN is limited, so that a network can be constructed to have a LAN load less than a predetermined level. That is, if the number of terminals connected to the LAN exceeds the limitation, the LAN is divided into a plurality of LANs which are connected to each other via relay units.

In the first type of conventional traffic control system, however, when an amount of transmission data is so much that the network is in the high traffic state, the suspension of data transmission would often occur because there is a high possibility that the other terminals perform data transmission in transmission from the terminal. The terminal which first detects that no carrier signal is present in the LAN is released from the transmission suspending state to come into the transmittable state. Therefore, there are terminals which cannot almost perform the data transmission and terminals which can perform the data transmission with a higher possibility than that of other terminals, so that unbalance between the terminals in data transmission could be caused. When there are data having a higher priority and data having a lower priority, there is another problem in that the data having a higher priority cannot be transmitted when the LAN is in the high load state.

In the second type of traffic control system, terminals are divided in advance in accordance with a plurality of LANs such that the traffic load can be even distributed, so that a hierarchical network can be constructed. However, the network is not always in the high traffic load state. In a case where the network is in the low traffic load state, there is another problem in that transmission delay would be caused because of the relay units. That is, when data should be transmitted between the terminals connected to the different LANs via a relay unit, the hierarchical network gives the opposite effect to what is intended.

SUMMARY OF THE INVENTION

An object of the present invention is to provide a LAN traffic control system in which a hierarchical structure is not required in the LAN, data can be transmitted even from respective terminals even if the LAN load is heavy, and data can be transmitted in accordance with the priority.

In the traffic control system for a local area network (LAN) in which the CSMA or CSMA/CD method is employed as an access control system, a plurality of terminals are connected via the LAN to a traffic control unit for allocating a time slot to each of the plurality of terminals in response to a data transmission request from each terminal and for monitoring the LAN load. The traffic control unit includes a load monitoring section, a high traffic mode noticing section, a time slot noticing section and a high traffic mode releasing section and each of terminals includes a high traffic mode receiving section, a transmission control section, a time slot requesting section and an end noticing section.

The load monitoring section monitors a traffic state of the LAN by detecting the number of terminals requesting data transmission as operating terminals of all terminals connected to the LAN, counts a data amount on the LAN a unit time, and calculates a LAN load factor based on a transmission rate of the LAN and the determined data amount, and notices the traffic state to the high traffic mode noticing section.

The high traffic mode noticing section issues to all the terminals connected to the LAN a notice indicating that a time slot allocating request should be issued only for the first data transmission after the high traffic mode has set, when it is noticed from the load monitoring section that the LAN load has become heavy.

The time slot noticing section having a time slot management table in which time slot managing information is stored, notices, when receiving a time slot allocating request from one terminal, allocation of a time slot to the one terminal based on art operating state of the other terminals.

The high traffic mode releasing section releases the high traffic mode to discard the time slot management table and sets the normal mode to notice the setting of the normal mode to all the terminals, when it is determined by the load monitoring section that the LAN load has become light.

The high traffic mode receiving section receives from the high traffic mode noticing section the notice that the high traffic mode is set, and from the high traffic mode releasing section a notice that the high traffic mode is released to set the normal mode.

The time slot requesting section issues a time slot allocating request to the time slot noticing section of the traffic control unit via the transmission control section only when data transmission is first to be performed after the high traffic mode has been set, after calculating transmission timing.

The transmission control section having the same time slot management table in which time slot managing information is stored as that of the time slot noticing section, performs data transmission according to the CSMA/CD method when the normal mode is set. The transmission control section determines whether or not the time slot allocating request is already issued when the high traffic mode Is set. The transmission control section calculates the transmission timing of the time slot allocating request from the time slot management table when the time slot allocating request is not yet issued, to cause the time slot requesting section to issue the time slot allocating request. The transmission control section calculates the transmission timing based on time slot managing information and a time slot allocated by the traffic control unit stored in the time slot management table, and performs data transmission in synchronous with the calculated transmission timing after suspension of the data transmission.

The end noticing section issues a notice indicating that the transmission is ended at a requesting terminal, to the load monitoring section at the time, when the data transmission is completed in the transmission control section, and the load monitoring section excludes the requesting terminal from the operating terminal on the LAN.

DESCRIPTION OF THE PREFERRED EMBODIMENTS

Tile present invention will be described below with reference to the accompanying drawings.

Figure 1:
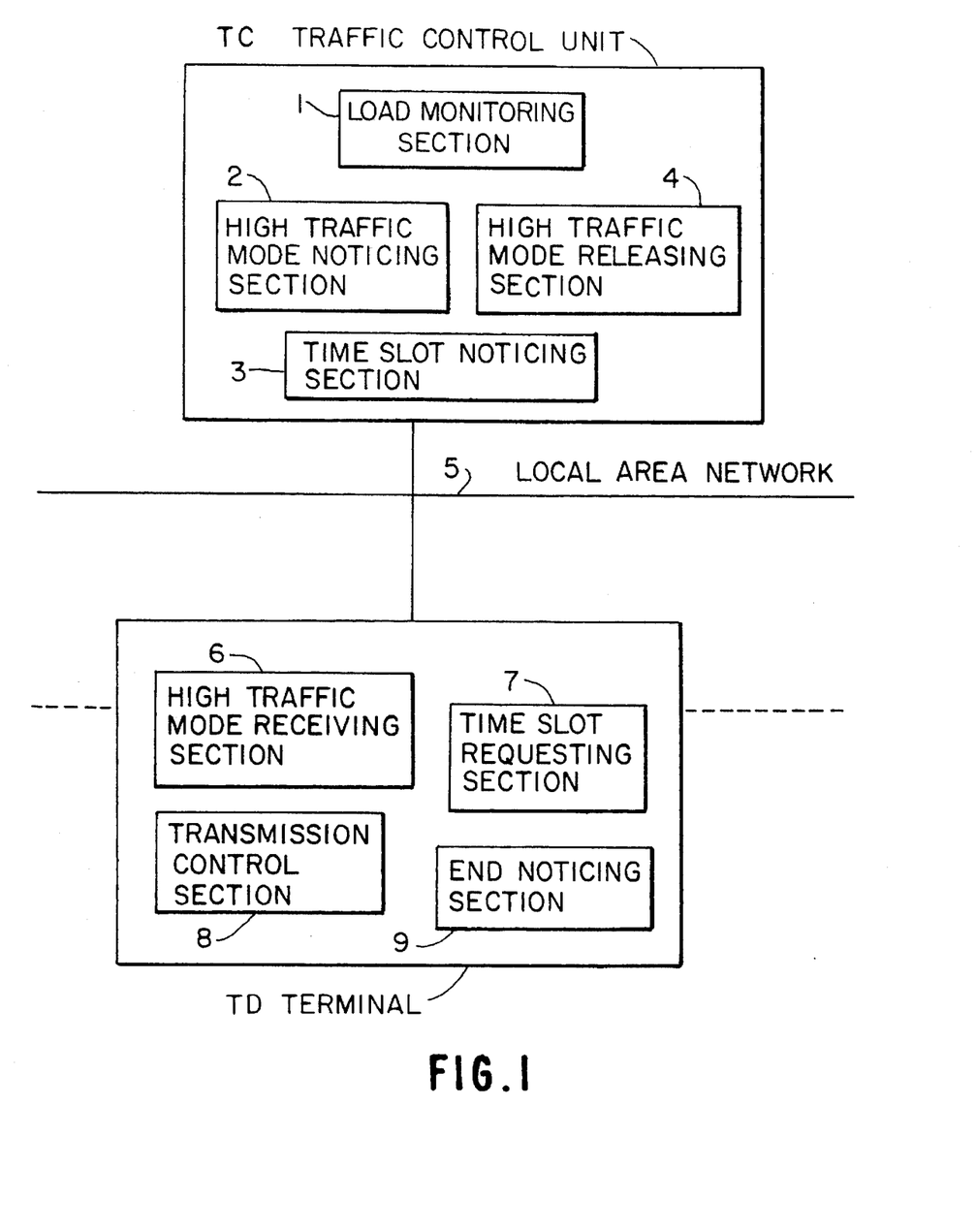
FIG. 1 is a block diagram of a traffic control system according to an embodiment of the present invention.

FIG. 1 is a block diagram of a traffic control system according to an embodiment of the present invention. A plurality of terminals TDs are connected via a local area network (LAN) 5 to a traffic control unit TC for allocating time slots for data transmission requests from the terminals TDs and monitoring the LAN load.

Tile traffic control unit TC includes a load monitoring section 1, a high traffic mode noticing section 2, a time slot noticing section 3 and a high traffic mode releasing section 4. The load monitoring section 1 monitors the traffic state on the LAN, i.e., the LAN load to notice it to the high traffic mode noticing section 2 by detecting the number of ones requesting data transmission as operating terminals of all the terminals connected to the LAN and by counting the amount of data on the LAN a unit time to calculate a LAN load factor based on a LAN transmission rate and the counted data amount. The high traffic mode noticing section 2 includes a time slot management table in which time slot managing information is stored and issues to all the terminals TDs connected to the LAN a notice indicating that the terminals should issue a time slot allocating request in only the first data transmission after a high traffic mode has been set, when the section 2 is informed from the load monitoring section 1 that the LAN load has become heavy. When a time slot allocating request is received from one of the terminals TDs, the time slot noticing section 3 allocates time slots to the time slot requesting terminal TD based on the operating state of all the other terminals TDs connected to the LAN and stores the time slot in the time slot management table. The high traffic mode releasing section 4 releases or resets the high traffic mode to a normal mode to discard the time slot management table and notices this to all the terminals TDs when it is detected by the load monitoring section I that the LAN load has become light.

Each of the terminals TDs includes a high traffic mode receiving section 6, a transmission control section 8, a time slot requesting section 8 and an end noticing section 9.

The high traffic mode receiving section 6 receives from the high traffic mode noticing section 2 the notice indicating that the high traffic mode is set and from the high traffic mode releasing section 4 the notice indicating that the high traffic mode is released to set the normal mode. The time slot requesting section 7 issues a time slot allocating request to the traffic control unit TC via the transmission control section 8 in only the first data transmission after the high traffic mode has set. The transmission control section 8 includes the same time slot management table, as that of the high traffic mode noticing section 2. The transmission control section 8 performs data transmission according to the CSMA or CSMA/CD method in the normal mode in which the LAN load is in the normal state or light. In the high traffic mode, the transmission control section 8 determines whether or not a time slot allocating request is already issued, and calculates the transmission timing from the time slot management table to control the time slot requesting section 7 to issue the time slot allocating request when it is determined that the time slot allocating request is not yet issued. When it is determined that the time slot allocating request is already issued, the transmission control section 8 calculates the transmission timing based on a time slot allocated by the traffic control unit TC and time slot managing information stored in the time slot management table, and performs the data transmission in synchronous with the transmission timing after suspension. The end noticing section 9 notices to the load monitoring section 1 of the traffic control unit TC that the terminal TD issuing the transmission request completes the data transmission at the time when all the transmission processing are completed in the transmission control section 8 and the requesting terminal TD is excluded from the operating terminals on the LAN.

The LAN traffic control system of the present invention includes two independent types of processing, i.e., the traffic mode switching processing and the data transmission processing.

Figure 2:
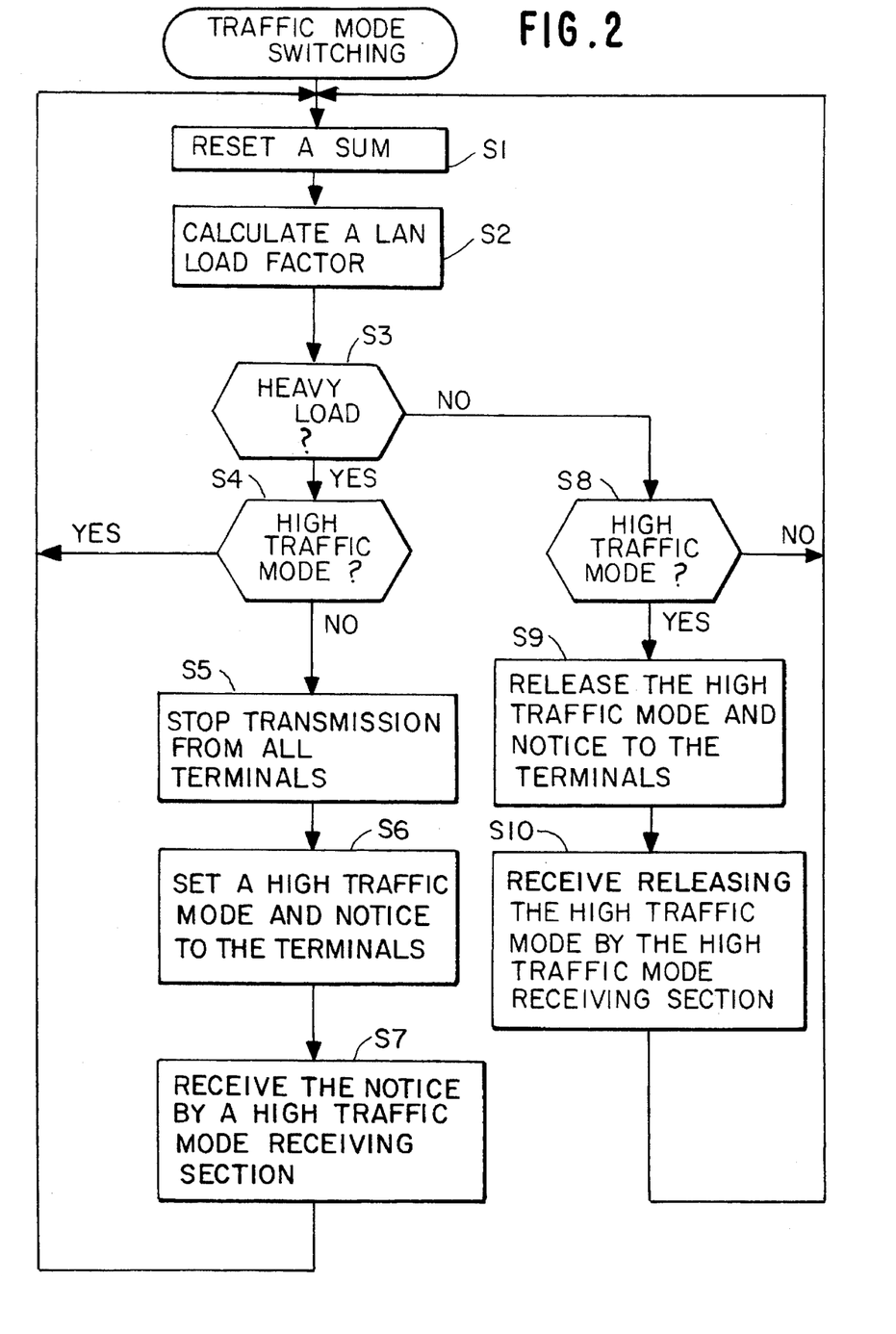
FIG. 2 is a flowchart for explaining a switching processing between two traffic modes.

First, the traffic mode switching processing will be described below with reference to the flowchart shown in FIG. 2. In the LAN traffic control system of the present invention, the traffic control unit TC always monitors the LAN traffic load by the load monitoring section 1. The monitoring procedure is as follows.

First, the load monitoring section I of the traffic control unit TC resets a sum to initialize it (step S1).

Next, the load monitoring section 1 detects the number of terminals as operating terminals issuing transmission requests of all the terminals TDs, counts an amount of data on the LAN a unit time and calculates a LAN load factor based on the transmission rate of the LAN and the counted data amount (step S2).

As a result of calculating the load factor in the step S2, when the load factor is within a range of the traffic mode, i.e., when the LAN load is heavy and the system is set in a high traffic mode or when the LAN load is light and the system is set in a normal mode, no switching processing is performed because the switching processing is not required. Then, the sum is reset again and the monitoring processing of the LAN load is repeated (steps S3, S4, S1 and S2, or S3, S8, S1 and S2).

When the high traffic mode is not set regardless of the high load factor, a high traffic mode noticing section 2 issues a data transmission stop request to all the terminals TDs connected to the LAN. This data transmission stop request is made by the generation of carrier signal to the LAN for a long time (step S5). Next, the high traffic mode noticing section 2 issues to all the terminals TDs a notice indicating that tile system has been set to the high traffic mode (step S6). When the high traffic mode receiving section 6 in each of all the terminals TD receives the notice, the switching processing is performed from the normal mode to the high traffic mode in each terminal (step S7).

When the present mode is the high traffic mode regardless of the low load factor, the high traffic mode releasing section 2 transmits an interrupt signal to all the terminals TDs to notice that the system is set to the normal mode (step S9). When the high traffic mode receiving section S in each terminal TD receives the high traffic mode releasing notice, each terminal TD discards its time slot management table and releases the high traffic mode (step S10). Thus, the system mode is switched from the high traffic mode to the normal mode.

Figure 3:
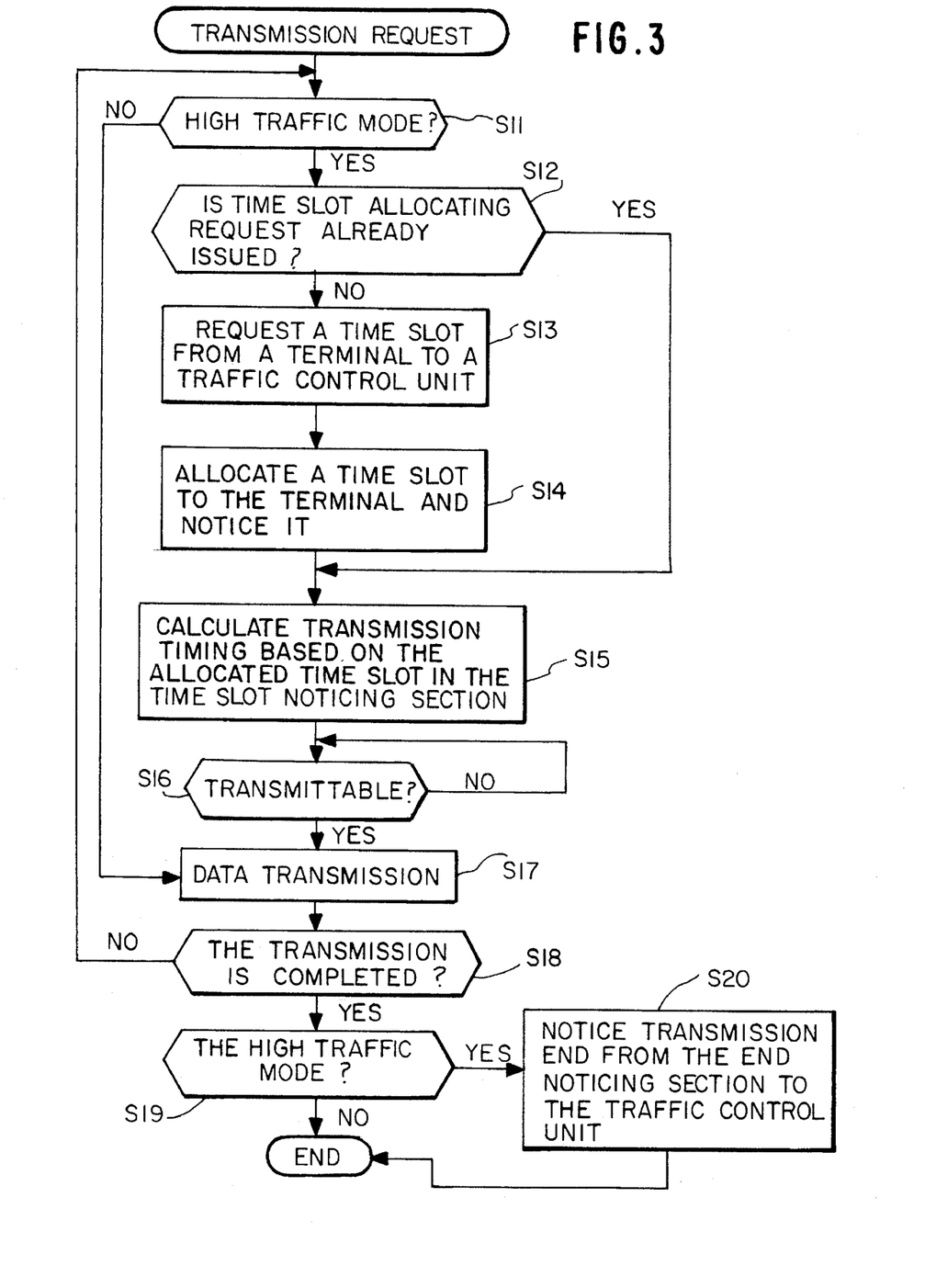
FIG. 3 is a flowchart indicating the processing from when a terminal issues a data transmission request to a traffic control unit to perform the transmission to when the terminal issues an end notice after the completion of transmission.
Figure 4:
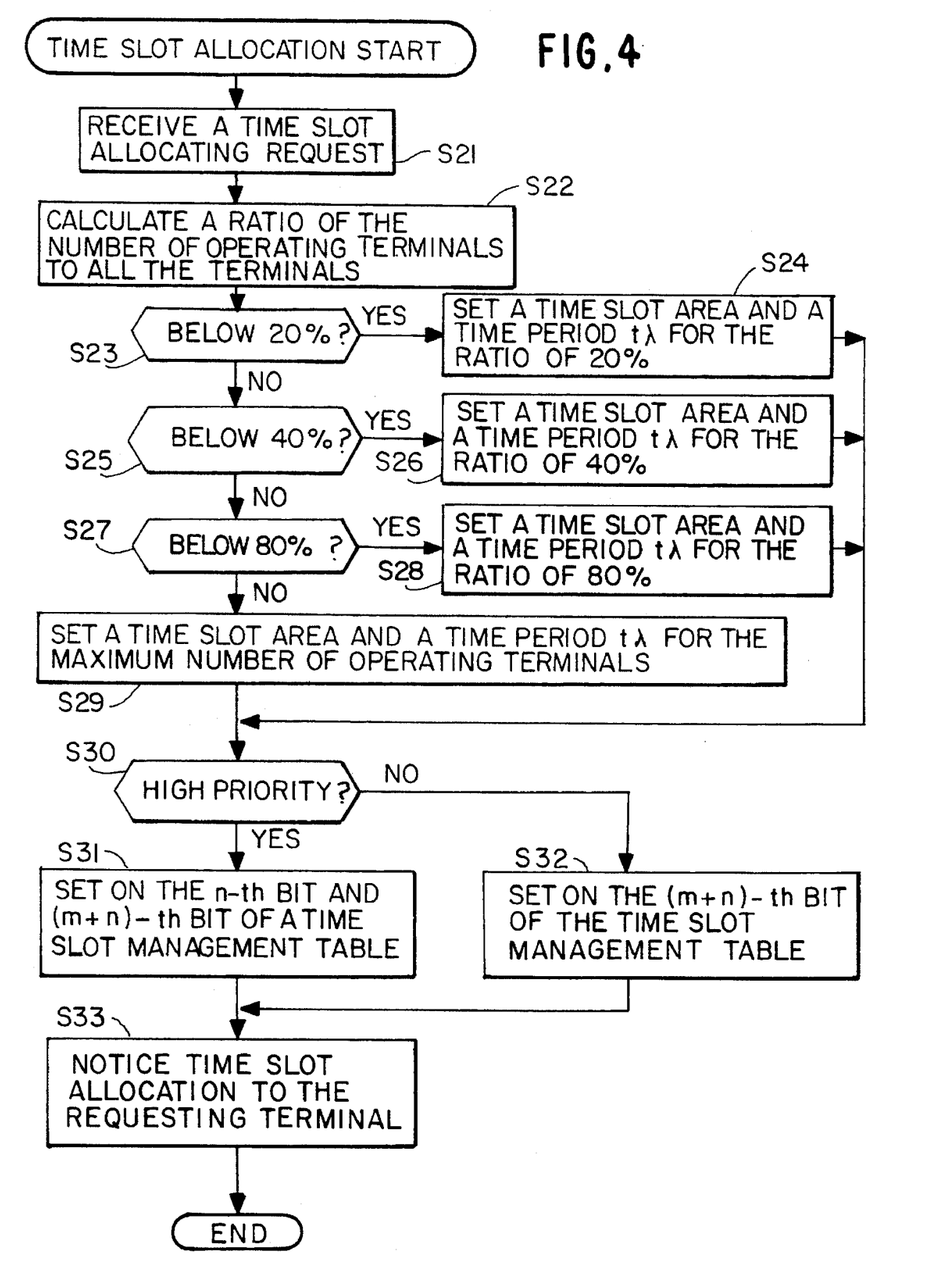
FIG. 4 is a flowchart indicating the detail of time slot allocating processing in the step S14 of FIG. 3.
Figure 5:
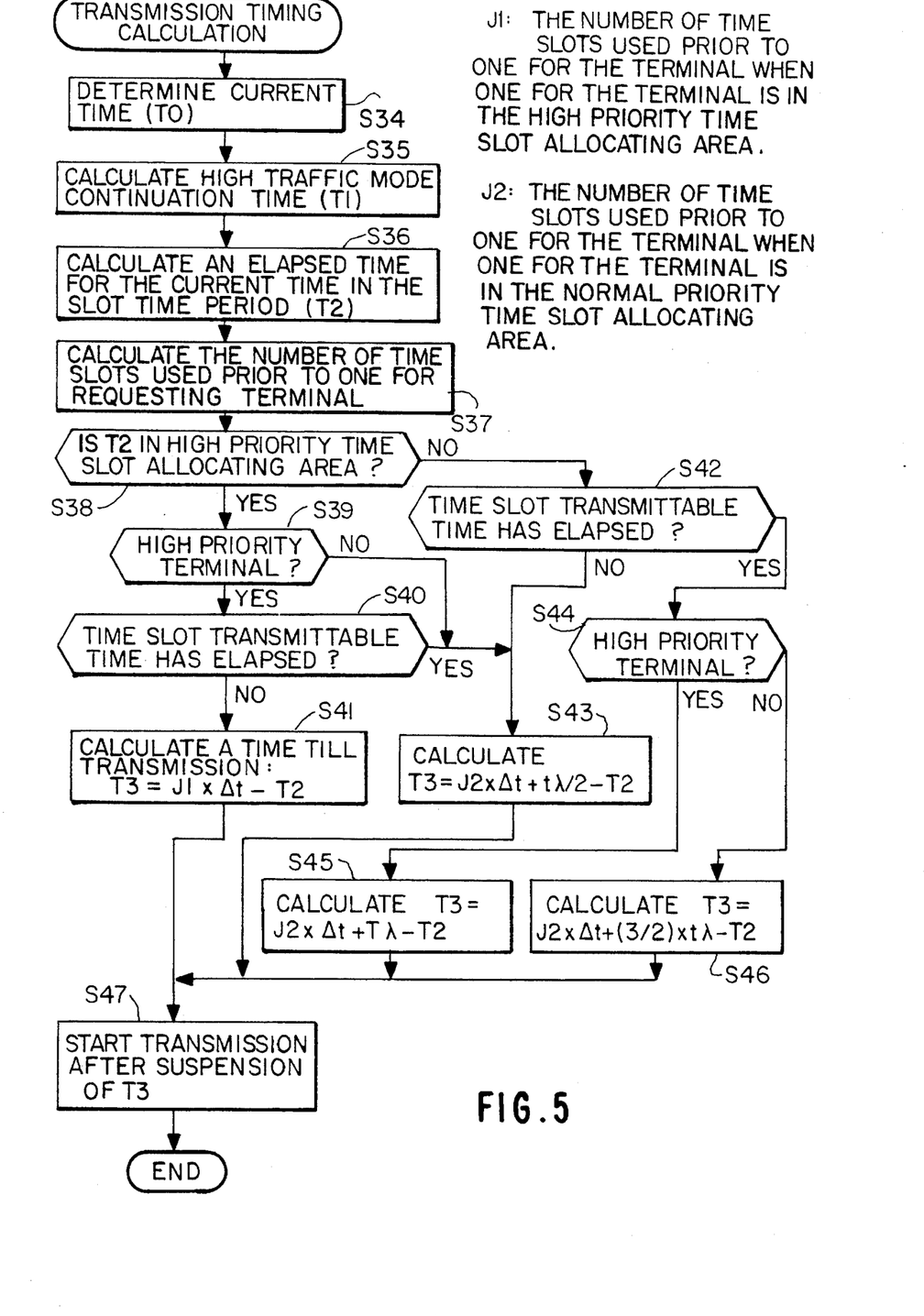
FIG. 5 is a flowchart indicating the detail of data transmission timing calculating processing in the step S15 of FIG. 3.

Next, the data transmission processing of each terminal TD will be described below with reference to the flowcharts of FIGS. 3, 4 and 5 and the time slot management table of FIG. 6.

The entire flow of the data transmission processing when one terminal TD performs it will be described with reference to FIG. 3.

When the terminal TD performs the data transmission, the transmission control section 8 determines whether or not the system has been the high traffic mode (step S11).

When the system has not been set in the high traffic mode, the transmission control section 8 performs the transmission processing of the normal mode because the normal mode is set (step S17).

When the system is set in the high traffic mode, because it is necessary to request allocation of a time slot only when the transmission processing is first performed after the high traffic mode has been set, the transmission control section 8 of the terminal TD determines whether or not a time slot is already requested, i.e., whether or not tile transmission processing is for first time (step S12).

If the request is not yet issued, the transmission control section 8 controls the time slot requesting section 7 of the terminal TD to issue the time slot allocating request to the time slot noticing section 3 of the traffic control unit TC (step S13). In response to the request, the time slot noticing section 3 of the traffic control unit TC allocates a time slot, stores time slot allocating information and managing information for calculating transmission timing in the time slot management table to be described later in detail and transmits the information to the transmission control section 8 of the terminal TD (step S14).

The transmission control section 8 of the terminal TD calculates the transmission timing based on the transmitted information of the time slot management table(step S15). The calculation will be described later in detail.

The transmission control section 8 suspends the data transmission and performs the data transmission at the time when the calculated transmission timing is past (steps S16 and S17).

The steps S11 to S17 are repeated until the data transmission processing is completed in the terminal(steps S11 to S18).

If the system is not in the high traffic mode at the time when the data transmission processing is completed, the transmission processing of the terminal is ended. On the other hand, if the system is in the high traffic mode, the end noticing section 9 of the terminal TD issues the transmission end notice to the load monitoring section 1 of the traffic control unit TC to end the transmission processing (steps S19 and S20). The terminal issuing the transmission end notice is excluded from the operating terminals on the LAN.

The outline of data transmission processing of the present invention was described above. Next, the details of the steps S14 and S15 will be described with reference to the flowcharts of FIGS. 4 and 5, respectively. The time slot management table will be described with reference to FIG. 6 prior to the detailed description of the steps S14 and S15.

Figure 6:
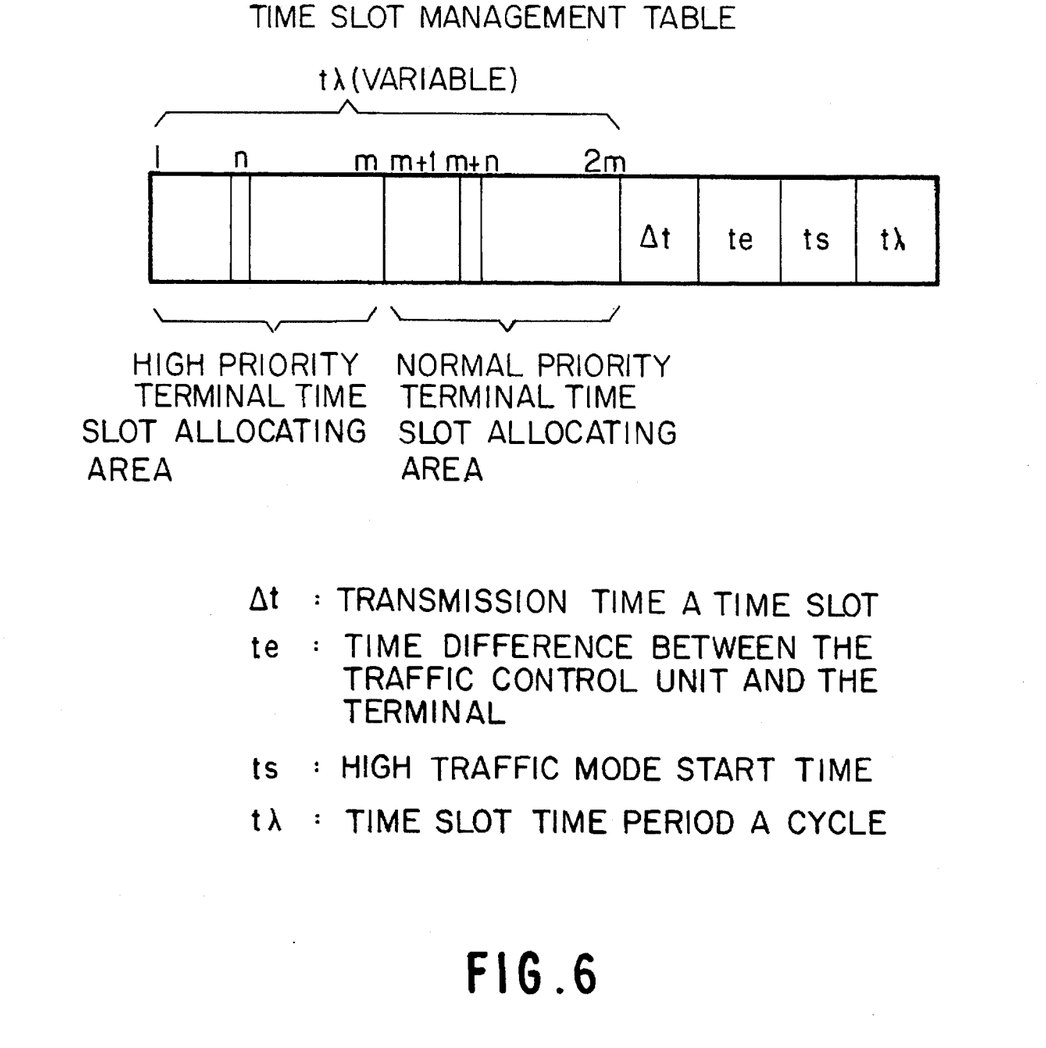
FIG. 6 is a time slot management table.

The time slot management table shown in FIG. 6 provided in the traffic control unit TC and the terminals TD. This time slot management table includes a time slot allocating area having a high priority terminal time slot area and a normal priority terminal time slot area, an area for a transmission time $\Delta t$ a time slot, an area for a time difference between the traffic control unit TC and the terminal TD, an area for a high traffic mode start time to set on the traffic control unit TC side when the high traffic mode is set, and an area for a time slot time period $t\gamma$ a cycle set on the traffic control unit at the allocation of a time slot.

The time slot allocating area of the time slot management table is allocated for each operating terminal with 2 bits, one being for high priority terminal and the other being for a normal priority terminal, thereby the time slot allocating area is 2 m bits of m bits for high priority and m bits for normal priority when the maximum number of operating terminals is m. The maximum number of operating terminals m is less than that of all the terminals connected to the LAN, and is determined based on a ratio of the operating terminals to all the plurality of terminals at the allocation of a time slot to be variable, so that the time slot time period a cycle $t\gamma$ is varied in accordance with the ratio. That is, the allocation of time slots can be made in one of a plurality of levels determined based on the number of operating terminals, so that frequency of time slot relocation can be reduced. More particularly, in the present invention, the ratio of the number of operating terminals is classified into four levels of 20% or less, 21 to 40%, 41 to 80%, and 81% or more and the time slot time period a cycle $t\gamma$ is set in accordance with the ratio level. If this classification is applied, when the number of terminals connected to the LAN is 200 and the number of operating terminals is 60, the ratio is 30 but m is 80 in a case of 40%.

The time slot allocation (step S14) in the time slot noticing section 3 of tile traffic control unit TC will be described with reference to FIGS. 4 and 6.

When receiving a time slot allocating request from the time slot requesting section 7 of a terminal (step S21), the time slot noticing section 3 of the traffic control unit TC calculates the ratio of the number of operating terminals to all the terminals connected to the LAN (step S22). If the ratio is equal to or less than 20%, the time slot noticing section 3 sets the time period $t\gamma$ for 20% and the time slot allocating area in the time slot management table of the traffic control unit TC based on the maximum number of operating terminals m (steps S23 and S24). Similarly, if the ratio is in a range of 21 to 40%, the time slot noticing section 3 sets the time period $t\gamma$ for 40% and the time slot allocating area in the time slot management table of the traffic control unit TC based on the maximum number of operating terminals m. When the ratio is in a range of 41 to 80%, the time slot noticing section 3 sets the time period $t\gamma$ for 80% and the time slot allocating area in the time slot management table of the traffic control unit TC based on the maximum number of operating terminals m (steps S27 and S28). When the ratio is in a range of 81 to 100%, the time slot noticing section 3 sets the time period t γ for 100% and the time slot allocating area in the time slot management table of the traffic control unit TC based on the maximum number of operating terminals m (step S29).

When the time slot requesting terminal TD is the high priority terminal, the time slot noticing section 3 sets "ON" in the n-th bit and (m+n)-th bit of the time slot management table of the traffic control unit(steps S30 and S31). When the time slot requesting terminal TD is the normal priority terminal, the time slot noticing section 3 sets "ON" in the (m+n)-th bit of the time slot management table of the traffic control unit(steps S30 and S32). In this case, n is an integer satisfying $1 \leq n \leq m$, and means that the terminal TD requests the time slot allocation as the n-th one of the plurality of terminals, so that two time slots are allocated to the terminal when the terminal is of the high priority and one time slot is allocated to the terminal when the terminal is of the normal priority.

Information of the time slot management table the traffic control unit including information of the allocated time slots is transmitted from the time slot noticing section 3 to the transmission control section 8 of the terminal TD such that the information is stored in the time slot management table of the terminal TD (step S33).

The transmission timing calculation (step S15) in the transmission control section 8 of the terminal TD based on the allocated time slots will be described with reference to FIGS. 5 and 6.

The transmission control section 8 determines a current time T0 in the terminal (step S34), and calculates a high traffic mode continuation time period (T1=T0-to) based on the high traffic mode start time to of time slot management table (step 835).

The transmission control section 8 calculates an elapsed time T2 indicating how long time elapses in the time slot time period a cycle t γ till the current time (step 836), where T2 is a remainder when T1/t γ.

Next, the transmission control section 8 calculates the number of time slots J1 or J2 which can be used prior to the terminal (step 837), where J1 is the number of time slots used prior to the terminal when the time slot allocated to the terminal is in the high priority terminal time slot allocating area and J2 is the number of time slots used prior to the terminal when the time slot allocated to the terminal is in the normal priority terminal time slot allocating area.

The suspension time T3 till the data transmission is calculated in accordance with one of the following six patterns:

(A) when the elapsed time T2 for the current time in the time slot time period a cycle t γ belongs to the high priority terminal time slot allocating area ($T2 \leq \frac{1}{2} \times t\ \gamma$) and the terminal is of the high priority:

(a) if T2 does not exceed the time slot allocating time ($J1 \times \Delta t \geq T2$), $T3=J1 \times \Delta t - T2$ (step S38, S39, S40 and S41), and (b) if T2 exceeds the time slot allocating time ($J1 \times \Delta t < T2$), $T3=32 \times \Delta t + \frac{1}{2} \times t\ \gamma - T2$ (step S38, S39, S40 and S43), (B) when the elapsed time T2 for the current time in the time slot time period a cycle t γ belongs to the high priority terminal time slot allocating area ($T2 \leq \frac{1}{2} t\ \gamma$) and the terminal is of the normal priority:

(c) $T3=J2 \times \Delta t + \frac{1}{2} \times t\ \gamma - T2$ (step 838, S39, and S41), (C) when the elapsed time T2 for the current time in the time slot time period a cycle t γ belongs to the normal priority terminal time slot allocating area ($T2 > \frac{1}{2} t\ \gamma$):

(d) if T2 does not exceed the time slot allocating time ($J2 \times \Delta t \geq T2 - \frac{1}{33} t\ \gamma$), $T3=J2 \times \Delta t + \frac{1}{2} \times t\ \gamma - T2$ (step S38, S42 and S43), (e) if T2 exceeds the time slot allocating time ($J2 \times \Delta t < T2 - \frac{1}{2} \times t\ \gamma$) and the terminal is of the high priority, $T3=J2 \times \Delta t + t\ \gamma - T2$ (step S38, S42, S44 and S45), and (f) if T2 exceeds the time slot allocating time ($J2 \times \Delta t < T2 - \frac{1}{2} \times t\ \gamma$) and the terminal is of the normal priority, $T3=J2 \times \Delta t + \frac{3}{2} \times t\ \gamma - T2$ (step S38, S42, S44 and S46).

As described above, the transmission control section 8 performs the transmission after the calculated suspension time.

What is claimed is:

1. (Amended) A traffic control system for a local area network (LAN) in which a plurality of terminals are connected to a traffic control unit for allocating a time slot to each of the plurality of terminals in response to a data transmission request from each terminal and for monitoring a LAN load, wherein said traffic control unit includes a load monitoring section, a high traffic mode noticing section, a time slot noticing section and a high traffic mode releasing section, wherein said each terminal includes a high traffic mode receiving section, a transmission control section, a time slot requesting section and an end noticing section, wherein said load monitoring section monitors a traffic state of said LAN, detecting the number of terminals requesting data transmission as operating terminals of said plurality of terminals connected to said LAN, counting a data amount on said LAN per unit time, and calculating a LAN load factor based on a transmission rate of said LAN and the counted data amount, and noticing a traffic state to said high traffic mode noticing section and to said high traffic mode releasing section, wherein said high traffic mode noticing section, in response to notice from said load monitoring section that the LAN load has become heavy, issues to all said plurality of terminals connected to said LAN a notice indicating that a time slot allocating request should be issued only for the first data transmission after a high traffic mode has set, wherein said time slot noticing section, having a time slot management table in which time slot managing information is stored, receives a time slot allocating request from one terminal and notices allocation of a time slot to said one terminal based on an operating state of other terminals, wherein said high traffic mode releasing section, in response to notice from said load monitoring section that the LAN load has become light, releases the high traffic mode to discard the time slot management table, sets a normal mode, and notices the setting of the normal mode to said plurality of terminals, wherein said high traffic mode receiving section receives from said high traffic mode noticing section a notice that the high traffic mode is set, and from said high traffic mode releasing section the notice that the high traffic mode is released to set the normal mode, wherein said time slot requesting section issues a time slot allocating request to said time slot noticing section of said traffic control unit via said transmission control section only when data transmission is first to be performed after the high traffic mode has been set, after calculating transmission timing, wherein said transmission control section has a same time slot management table in which time slot managing information is stored as that of said time slot noticing section, performs data transmission when the normal mode is set, determines whether or not the time slot allocating request is already issued when the high traffic mode is set, calculates the transmission timing of the time slot allocating request from the time slot management table when the time slot allocating request is not yet issued, to cause said time slot requesting section to issue the time slot allocating request, calculates the transmission timing based on time slot managing information and a time slot allocated by said traffic control unit stored in the time slot management table, and performs data transmission in synchronism with the calculated transmission timing after suspension of the data transmission, and wherein said end noticing section issues a notice indicating that the transmission is ended at a requesting terminal, to said load monitoring section at the time when the data transmission is completed in said transmission control section and excludes the requesting terminal from the operating terminal on said LAN.

2. A traffic control system for a LAN according to claim 1, wherein said high traffic mode noticing section requests data transmission stop to the plurality of terminals connected to said LAN to issue to the plurality of terminals the notice indicating that the high traffic mode is set, when the high traffic mode is not set regardless of a heavy load factor, as a result of determining the load factor, wherein said high traffic mode receiving section discards its own time slot management table and releases the high traffic mode when receiving the notice indicating that the high traffic mode has been released and, wherein said high traffic mode releasing section releases the high traffic mode to set the normal mode and transmits an interrupt signal to all the plurality of terminals to notice that the normal mode has been set.

3. A traffic control system for a LAN according to claim 1, wherein said transmission control section of each of said plurality of terminals:

determines whether or not said system is set in the high traffic mode before the data transmission;

performs the data transmission for a respective terminal of said plurality of terminals based on a carrier sense multiple access (CSMA) method when the high traffic mode is not set;

determines whether or not the time slot allocating request is already issued from the respective terminal at the first data transmission after the high traffic mode has been set when the high traffic mode is set;

calculates the transmission timing of the time slot allocating request from the time slot management table when the time slot allocating request is not yet issued, to cause said time slot requesting section to issue the time slot allocating request to said time slot noticing section of said traffic control unit;

calculates the transmission timing based on the time slot management table allocated by said time slot noticing section;

suspends the data transmission until the transmission timing is reached, and performs the data transmission in synchronization with the calculated transmission timing;

repeats the above processing until the data transmission from the respective terminal is completed; and when the data transmission is completed, ends the data transmission if the high traffic modes in not set, and ends the data transmission after controlling said end noticing section of the respective terminal to notice the end of the data transmission to said load monitoring section of said traffic control unit to exclude the respective terminal from the operating terminals, if the high traffic mode is set, and wherein said time slot noticing section allocates a time slot in response to said transmission control section, and stores time slot allocating information and managing information for calculating the transmission timing in the time slot management table to transmit to said transmission control section of the respective terminal.

4. A traffic control system for a LAN according to claim 1, wherein the time slot management table includes a time slot allocating area with a high priority terminal time slot allocating area and a normal priority terminal time slot allocating area, an area for transmission time per time slot, an area for a high traffic mode start time set by said traffic control unit when the high traffic mode is set, and an area for a time slot time period per cycle set by said traffic control unit at allocation of a time slot, wherein the time slot allocating area is allocated with 2 bits, one being for high priority and the other being for normal priority, thereby the time slot allocating area is 2 m bits of m bits for high priority and m bits for normal priority when the maximum number of operating terminals is m, and wherein the maximum number of operating terminals is determined based on a ratio of the operating terminals to all the plurality of terminals at the allocation of a time slot and variable, so that the time slot time period per cycle is varied in accordance with the ratio to make the allocation of a time slot in one of a plurality of levels based on the number of operating terminals.

5. A traffic control system for a LAN according to claim 3, wherein said time slot noticing section:

receives the time slot allocating request from said time slot requesting section of the respective terminal;

calculates the ratio of the number of operating terminals to all said plurality of terminals connected to said LAN;

sets the time slot allocating area based on the maximum number of operating terminals m and the time period for 20% in the time slot management table of the traffic control unit when the ratio is equal to or less than 20%;

sets the time slot allocating area based on the maximum number of operating terminals m and the time period for 40% in the time slot management table of the traffic control unit when the ratio is in a range of 21 to 40%;

sets the time slot allocating area based on the maximum number of operating terminals m and the time period for 80% in the time slot management table of the traffic control unit when the ratio is in a range of 41 to 80% sets the time slot allocating area based on the maximum number of operating terminals m and the time period for 100% in the time slot management table of the traffic control unit when the ratio is in a range of 81 to 100%;

sets "ON" in the n-th bit and (m+n)-th bit of the time slot management table of the traffic control unit when the time slot requesting terminal is the high priority terminal.

sets "ON" in the (m+n)-th bit of the time slot management table of the traffic control unit when the time slot requesting terminal is the normal priority terminal;

when n is an integer satisfying $1 \leq n \leq m$, and means that the respective terminal requests the time slot allocation as the n-th one of the plurality of terminals, so that two time slots per cycle are allocated to the respective terminal when the respective terminal is of the high priority and one time slot per cycle is allocated to the respective terminal when the respective terminal is of the normal priority; and transmits information of time slot management table of the traffic control unit including information of the allocated time slots from said time slot noticing section to said transmission control section of the respective terminal to store the information in the time slot management table of the respective terminal.

6. A traffic control system for a LAN according to claim 3, wherein said transmission control section:

determines a current time TO in the respective terminal;

calculates a high traffic mode continuation time period (T=T0-to) based on the high traffic mode start time to of time slot management table;

calculates an elapsed time T2 indicating how long time elapses in the time slot time period per cycle tγ till the current time, where T2 is a remainder when T1/tγ;

calculates the number of time slots J1 or J2 which can be used prior to the respective terminal, where J1 is the number of time slots used prior to the respective terminal when the time slot allocated to the respective terminal is in the high priority terminal time slot allocating area and J2 is the number of time slots used prior to the respective terminal when the time slot allocated to the respective terminal is in the normal priority terminal time slot allocating area; and calculates a suspension time till the data transmission in accordance with:

(A) when the elapsed time T2 for the current time in the time slot time period per cycle tγ belongs to the high priority terminal time slot allocating area (T2≦½×tγ) and the respective terminal is of the high priority, (a) if T2 does not exceed the time slot allocating time (J1×Δt≧T2), T3=J1×Δt–T2, and (b) if T2 exceeds the time slot allocating time (J1×Δt T2), T3=J2×Δt+½×tγ–T2, (B) when the elapsed time t1 for the current time in the time slot time period per cycle tγ belongs to the high priority terminal time slot allocating area (T2≦½×tγ) and the respective terminal is of the normal priority, (c) T3=J2×Δt+½×tγ–T2, (C) when the elapsed time t1 for the current time in the time slot time period per cycle tγ belongs to the normal priority terminal time slot allocating area (T2>½×tγ).

(d) if T2 does not exceed the time slot allocating time (J2×Δt≧T2–½×tγ), T3=J2×Δt+½×tγ–T2, (e) if T2 exceeds the time slot allocating time (J2×Δt<T2 –½×tγ) and the respective terminal is of the high priority, T3 =J2×Δt+tγ–T2, and (f) if T2 exceeds the time slot allocating time (J2×Δt T2–½×tγ) and the respective terminal is of the normal priority, T3 =J2×Δt+³⁄₂×tγ–T2.

7. A traffic control system for a local area network (LAN), comprising:

a traffic control unit, connected to said LAN, comprising a time slot noticing section, a high traffic mode noticing section, a high traffic mode releasing section, and a load monitoring section; and a plurality of terminals connected to said LAN, each of which comprises a respective high traffic mode receiving section, a respective time slot requesting section, a respective transmission control section, and a respective end noticing section;

said load monitoring section determining a LAN load based on an amount of data transmitted through said LAN per a unit of time, and determining a traffic state based on said LAN load;

said traffic state indicating one of a plurality of LAN load levels, including a heavy LAN load and a normal LAN load;

said load monitoring section providing said traffic state to said high traffic mode noticing section and to said high traffic mode releasing section;

said high traffic mode noticing section issuing a high traffic mode notice to said plurality of terminals when said traffic state indicates said heavy LAN load;

said high traffic mode releasing section issuing a normal traffic mode notice to said plurality of terminals when said traffic state does not indicate said heavy LAN load;

said time slot noticing section (1) having a time slot management table for storing time slot managing information, and (2) sending a respective time slot allocation notice to a respective one of said plurality of terminals in response to a respective time slot allocation request;

said high traffic mode receiving section receiving said high traffic mode notice and said normal traffic mode notice, and indicating said traffic state to said transmission control section;

said transmission control section having a respective time slot management table the same as said time slot management table of said time slot noticing section;

said time slot requesting section generating a respective time slot allocation request, in response to a requirement to transmit a respective data message, only (1) if said traffic state indicates said heavy LAN load, and (2) if said respective time slot allocation request for said data message has not already been generated;

said transmission control section sending said time slot allocation request to said traffic control unit;

said transmission control section sending said respective data message in synchronization with a transmission timing of said respective data message when said traffic state indicates said heavy LAN load;

said transmission timing of said respective data message being based on said respective time slot managing information and on a time slot indicated by said time slot allocation message; and said end noticing section issuing a data transmission end notice to said traffic control unit when transmission of said respective data message is complete, if said traffic state indicates said heavy LAN load.

8. The traffic control system for a LAN as set forth in claim 7, wherein:

said transmission control section transmits data according to a carrier sense multiple access (CSMA) method when said traffic state does not indicate said heavy LAN load.

9. The traffic control system for a LAN as set forth in claim 7, wherein:

each of said plurality of terminals has one of a plurality of priority levels, including a high priority and a normal priority;

said time slot management table includes a time slot allocating area which includes a high priority terminal time slot allocating area and a normal priority terminal time slot allocating area; and said time slot noticing section allocates time slots for terminals having a high priority level from said high priority terminal time slot allocating area, and allocates time slots for terminals having a normal priority level from said normal priority terminal time slot allocating area.

* * * * *

UNITED STATES PATENT AND TRADEMARK OFFICE
CERTIFICATE OF CORRECTION

PATENT NO. : 5,483,533  
DATED : January 9, 1996  
INVENTOR(S) : Hiroaki Kuba

Page 1 of 2

It is certified that error appears in the above-indentified patent and that said Letters Patent is hereby corrected as shown below:

Col. 3, line 28, delete "Tile", insert --The--.  
Col. 3, line 36, delete "Tile", insert --The--.  
Col. 3, line 67, delete "8", insert --7--.  
Col. 5, line 2, delete "tile", insert --the--.  
Col. 5, line 37, delete "tile", insert --the--.  
Col. 6, line 19, delete "$\gamma$", insert --$\lambda$--.  
Col. 6, line 31, delete "$\gamma$", insert --$\lambda$--.  
Col. 6, line 39, delete "$\gamma$", insert --$\lambda$--.  
Col. 6, line 54, delete "$\gamma$", insert --$\lambda$--.  
Col. 6, line 59, delete "$\gamma$", insert --$\lambda$--.  
Col. 6, line 63, delete "$\gamma$", insert --$\lambda$--.  
Col. 7, line 1, delete "$\gamma$", insert --$\lambda$--.  
Col. 7, line 30, delete "to", insert --ts--.  
Col. 7, line 32, delete "835", insert --S35--.  
Col. 7, line 35, delete "$\gamma$", insert --$\lambda$--.  
Col. 7, line 35, delete "836", insert --S36--.  
Col. 7, line 36, delete "$\gamma$", insert --$\lambda$--.  
Col. 7, line 39, delete "837", insert --S37--.  
Col. 7, line 36, delete "$\gamma$", insert --$\lambda$--.  
Col. 7, line 39, delete "837", insert --S37--.  
Col. 7, line 40, delete "$\gamma$", insert --$\lambda$--.  
Col. 7, line 50, delete "$\gamma$", insert --$\lambda$--.  
Col. 7, line 55, delete "$\gamma$", insert --$\lambda$--.  
Col. 7, line 57, delete "$\gamma$", insert --$\lambda$--.  
Col. 7, line 59, delete "$\gamma$", insert --$\lambda$--.  
Col. 7, line 60, delete "$\gamma$", insert --$\lambda$--.

UNITED STATES PATENT AND TRADEMARK OFFICE
CERTIFICATE OF CORRECTION

PATENT NO. : 5,483,533
DATED : January 9, 1996
INVENTOR(S) : Hiroaki Kuba

It is certified that error appears in the above-indentified patent and that said Letters Patent is hereby corrected as shown below:

Col. 7, line 63, delete "$\gamma$", insert --$\lambda$--.
Col. 7, line 64, delete "$\gamma$", insert --$\lambda$--.
Col. 7, line 66, delete both occurrences of "$\gamma$", insert --$\lambda$--.
Col. 8, line 2, delete "$\gamma$", insert --$\lambda$--.
Col. 8, line 3, delete "$\gamma$", insert --$\lambda$--.
Col. 8, line 5, delete "$\gamma$", insert --$\lambda$--.
Col. 8, line 6, delete "$\gamma$", insert --$\lambda$--.

Col. 11, line 20, 21, 35, 36, 42, 45, 46, 48, 50, 51, 53, 56, 57, 60, and 61, delete "$\gamma$", insert --$\lambda$--.

Signed and Sealed this

Twenty-third Day of July, 1996

Attest:

BRUCE LEHMAN

Attesting Officer

Commissioner of Patents and Trademarks